United States Patent
Pereira

(10) Patent No.: US 9,292,842 B2
(45) Date of Patent: Mar. 22, 2016

(54) SYSTEMS AND METHODS FOR MANAGING SOFTWARE LICENSING AGREEMENTS

(71) Applicant: Verious, Inc., San Carlos, CA (US)

(72) Inventor: Anil H. Pereira, San Carlos, CA (US)

(73) Assignee: Anil H. Pereira, San Carlos, CA (US)

( * ) Notice: Subject to any disclaimer, the term of this patent is extended or adjusted under 35 U.S.C. 154(b) by 773 days.

(21) Appl. No.: 13/663,055

(22) Filed: Oct. 29, 2012

(65) Prior Publication Data

US 2013/0110726 A1    May 2, 2013

Related U.S. Application Data

(60) Provisional application No. 61/553,092, filed on Oct. 28, 2011.

(51) Int. Cl.
*G06F 21/00* (2013.01)
*G06Q 20/12* (2012.01)
*G06F 21/10* (2013.01)

(52) U.S. Cl.
CPC .......... *G06Q 20/1235* (2013.01); *G06F 21/105* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,226,618 | B1* | 5/2001 | Downs | G06F 21/10 380/279 |
| 2003/0120557 | A1* | 6/2003 | Evans | G06F 21/10 705/51 |
| 2007/0156726 | A1* | 7/2007 | Levy | G06F 17/3002 |
| 2009/0006192 | A1* | 1/2009 | Martinez | G06Q 30/02 705/14.69 |
| 2009/0171806 | A1* | 7/2009 | Klinger | G06Q 30/0603 705/26.1 |
| 2009/0256972 | A1* | 10/2009 | Ramaswamy | G06Q 30/02 348/738 |
| 2010/0031299 | A1* | 2/2010 | Harrang | H04N 21/4104 725/80 |
| 2014/0359057 | A1* | 12/2014 | Hensgen | H04L 67/1095 709/217 |
| 2015/0221316 | A1* | 8/2015 | Mufti | H04N 21/4394 700/94 |

* cited by examiner

*Primary Examiner* — Steven Kim
*Assistant Examiner* — Johann Choo
(74) *Attorney, Agent, or Firm* — Greenberg Traurig LLP

(57) ABSTRACT

Systems and methods to provide licensing and licensing management to source code components. The system receives a request from a component developer for a component license. The system sends a public key, a component identifier, and licensing code to the developer and the developer embeds the public key, the component identifier, and the licensing code within the source of the component. The developer sends the embedded component to the system, which publishes the component for sale on a web site. A purchaser of the component can embed the component, API code, and a generated license key into a developed application. The API code is invoked, which activates the component within the application. The application can be sent to the system where it can be published to a web site for sale.

12 Claims, 16 Drawing Sheets

100

1200

1300

1400

1500

2000

SYSTEMS AND METHODS FOR MANAGING SOFTWARE LICENSING AGREEMENTS

CROSS-REFERENCE TO RELATED APPLICATION

This application claims priority under 35 U.S.C. §119(e) to U.S. Provisional Patent Application Ser. No. 61/553,092, filed on Oct. 28, 2011.

FIELD OF THE TECHNOLOGY

At least some embodiments disclosed herein relate to managing the sale and distribution of licenses for software components in an online environment and enforcing licensing terms through the binding of licensed software code components to specific applications for which they are licensed.

BACKGROUND

At its most basic level, Object-oriented programming (OOP) can be defined as a programming paradigm that is centered on the use of "objects", which are data structures consisting of data fields and methods together with their interactions. OOP increases the efficiency of application development through the concept of "reuse", which means that a collection of programming code modules could be fitted together like the gears of a machine in order to collectively perform a desired function. This has allowed software application developers to create individual objects for use in their programs and then share them with, or license them to, other developers having a need for similar functionality as that provided by a particular object.

As the experience of computing has changed over the years, so too has the nature and need for computer software application development. For example, cellular telephones have evolved into "smart phones", capable of providing many personal computing features from a mobile computing device. As such, demand continues to increase for computer applications specifically designed for the unique configurations and needs of mobile computing devices.

OOP is a model that allows developers to quickly adapt to the rapidly evolving needs of mobile computing through object (i.e., application component) reuse. Some developers have openly shared application components that they necessarily developed to provide a specific function where a solution did not previously exist. This has led to a market that allows developers to continue to benefit from the collaborative environment fostered by OOP, while also receiving compensation for their efforts.

SUMMARY OF THE DESCRIPTION

Various embodiments of the systems and methods disclosed herein provide a marketplace for application components through licensing control features facilitated through a method of encapsulating usage controls both within a licensed application component and a parent application utilizing the component. Some embodiments are summarized in this section.

In an embodiment, application components can also be used to mediate data and content between a third party data source (e.g., sports feed, news feed, weather feed, etc.) and a native application. As such, a pre-built component can be used to "meter" the number of users or enforce other license terms (e.g., a per user fee, an annual fee, etc.) for a provider of proprietary or third party content.

In an embodiment, a method implemented in a data processing system includes: receiving, at the data processing system, a request for a component license from a client. The data processing system sends a public key, a component identifier, and licensing code to the client. The client embeds the public key, the component identifier, and the licensing code within the source of a component that the client developed. The data processing system then receives the component from the client and publishes it to a web site.

In an embodiment, when a purchaser chooses to purchase the component, a request to purchase the component is sent to the data processing system. The data processing system generates a license key in response to receiving the request and associates an application identifier with the license key. The data processing system sends the component and API code to the purchaser. The purchaser embeds the component and API code into an application. The application then invokes the API code to activate the component. The data processing system receives the application with the embedded component from the purchaser and publishes the application to the web site.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
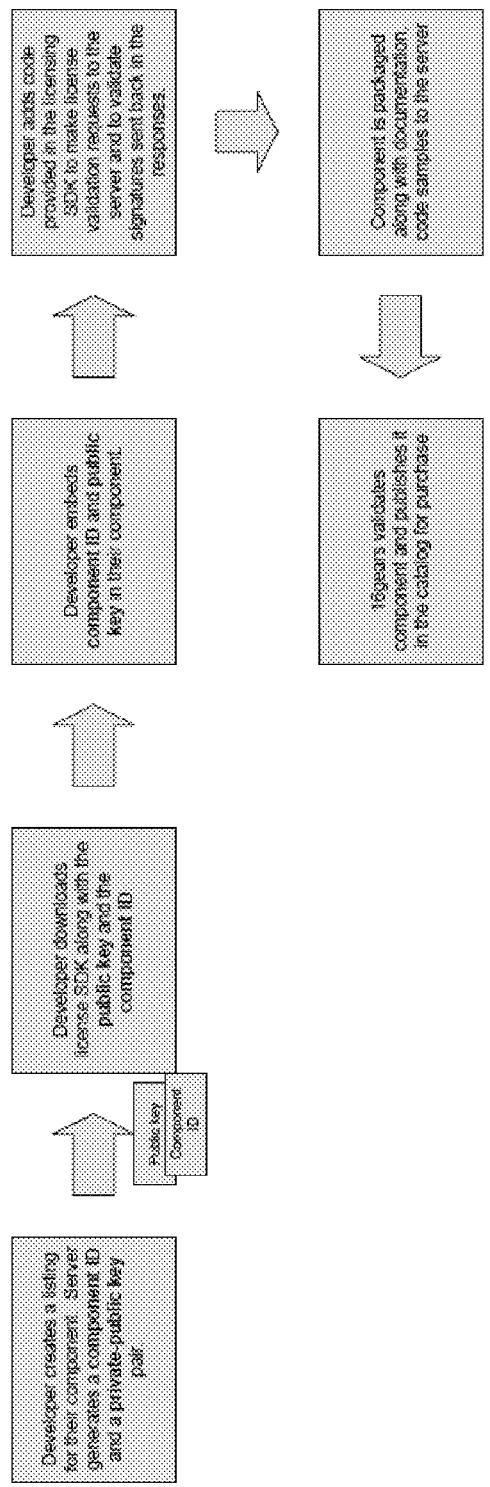
FIG. 1 is a flowchart showing a process flow for facilitating component licensing in accordance with an embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "an embodiment" or "an embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but not other embodiments.

As used herein, an "application component" can include any computer-readable instruction configured to perform specified operations relating to sending and receiving information; processing data; storing and retrieving data; performing calculations, and the like. In general terms, an application component is computer program code designed to perform a specified operation in a decoupled environment. The application component can be integrated with any number of other components where they can interact to perform more complex operations, for example. Such components are typically deployed within an object-oriented architecture and are written in a language designed for that architecture such as, for example, C++, C#, Java, SmallTalk, Visual Basic, etc.

An application component can also be referred to as a "software component", "mobile application component", "mobile app component", "app component", "code component", "component", "code module", "module", "object", "function", "SDK", "source code project", and "applet." These terms can be used interchangeably herein and should be understood to carry the same general definition as that of the application component unless otherwise disclosed.

The disclosure includes methods and apparatuses which perform these methods, including data processing systems which perform these methods, and computer-readable media containing instructions which when executed on data processing systems cause the systems to perform these methods.

With over 700,000 iOS and Android apps developed to date and millions more being developed, mobile app developers are searching for ways to add new features, reduce development complexity, accelerate time-to-market and minimize cost. Today, app developers create features for new or existing apps virtually from scratch, marginalizing return on investment. Technology companies, equally, create Software Development Kids (SDKs) to provide developers functionality and componentized tools to access their pre-built software resources and services. However, the mobile app development community is sitting on top of millions of potentially re-usable software libraries, a virtual goldmine of mobile app functionality that can be leveraged by others.

With the booming global demand for consumer and enterprise apps, mobile developers are looking for ways to quickly add new features without reinventing the wheel. A trusted marketplace for mobile app components unleashes the value of millions of software libraries for a range of platforms and frameworks—including iOS, Android, Windows Phone, HTML5, Unity, Appcelerator, Sencha, Worklight, Blackberry and others—that are currently trapped in existing code bases. Application developers are able to get to market faster and their counterparts can tap into an entirely new B2B revenue stream, licensing components, which offers a win-win for the global mobile developer community. Software developers and publishers can also create libraries and components de novo based on a perceived or anticipated market need or demand.

In various embodiments, the disclosed component marketplace enables, for example, iOS and Android developers to find, discover and buy pre-built, pre-tested mobile application components listed by other experienced mobile app developers. These components can be standalone client-side libraries or libraries that connect to third party services and platforms. Developers can discover pre-built programming modules or new app features, significantly reduce costs, get to market faster and find new ways to increase monetization of their apps.

In an embodiment, if a desired component is not yet listed on the component marketplace, mobile app developers can post and vote for "component requests", creating market pull from a global mobile developer network. Requests are relayed to the component marketplace's network of independent mobile application developers and mobile application development service providers. Component requests totaling over $100,000, worth much more in downstream licensing value once listed on the site, have already been listed on the disclosed component marketplace.

In an embodiment, component marketplace listings address varying needs of mobile application developers. For example, the component marketplace puts a "lens" on the mobile application development category so that application developers can find and discover the software libraries, tools and services they need, all in one place. In an embodiment, the disclosed component marketplace is configured to manage any number of listings for components of varying types, including:

- Pre-built, pre-tested components for iOS and Android (e.g., 3D globe);
- Mobile component source code for iOS and Android;
- "Component wanted" requests along with estimated prices (e.g., page-turn component for iOS tablets—$10,000);
- Mobile SDKs from a range of third party service and platform providers (e.g., Socialize);

Third party app development services (e.g., testing, translation);

Mobile development tools and frameworks; and

Mobile open source projects for iOS and Android development.

In an embodiment, the disclosed component marketplace allows sellers to tap into new revenue streams by leveraging existing assets. Component developers can list components on the disclosed component marketplace and charge an annual or lifetime license fee; all components include free trial functionality. Component developers do what they do best, write code for mobile apps, and use the disclosed component marketplace to reach qualified buyers, list components, facilitate buyer-seller licensing and payment, and enable notifications for version updates.

In an embodiment, iOS and Android developers can access the component marketplace by way of the internet. In an embodiment, the disclosed component marketplace allows application developers to complete a free, simple sign-up and, once approved, can browse listings, post component requests and vote on existing requests. In an embodiment, application developers can also try components on a trial basis for a limited period, for example, for non-commercial purposes and download a free bar code scanner for Android as well.

In an embodiment, component developers complete a seller sign-up process and, once approved, can access a component marketplace component wizard to "wrap" and submit a component for testing and subsequent listing in the component marketplace. An annual setup fee for component developers can be waived for specific developers.

In an embodiment, component developers can review component requests posted by buyers to prioritize which components to release (or build) next.

In an embodiment, the component marketplace allows application developers to integrate the disclosed license manager into Components for iOS, Android, or any other mobile device operating system.

FIG. 1 shows an embodiment of a process flow for preparing a component for listing in the disclosed component marketplace. The process can be facilitated through an interface that is provided to the developer through a web client or any other interface. The interface can, for example, allow the user to create listing information for the component and download a software development kit (SDK). The SDK includes a public key and a component ID that is specific to the component that the developer wishes to list. The developer embeds the component ID and the public key into the component and adds code provided in the SDK. This code executes license validation requests once the component is licensed by a component marketplace user. Once updated with all of the information needed by the component marketplace for licensing and license enforcement, the component that is uploaded to the component marketplace where it is validated and published in an online catalog.

As will be apparent, the various embodiments of the systems and methods disclosed herein utilize public-key/private key authentication techniques. It should be understood that any public-key/private key authentication techniques now know or later to be developed in the art could be used. Furthermore, it should also be understood that any other type of authentication techniques could be used, including any type of symmetric or asymmetric key techniques now know or later to be developed in the art.

In an embodiment, the SDK allows the developer to embed a license key that is valid for a defined duration of time as well as provides an ability for the component marketplace to meter on the back end, allowing publishers to extend a "free trial" or "rate-limited" model to their offerings (e.g., a free 30-day trial, free use for up to 10 users, etc). This is very currently difficult to enforce within the software industry.

Figure 2:
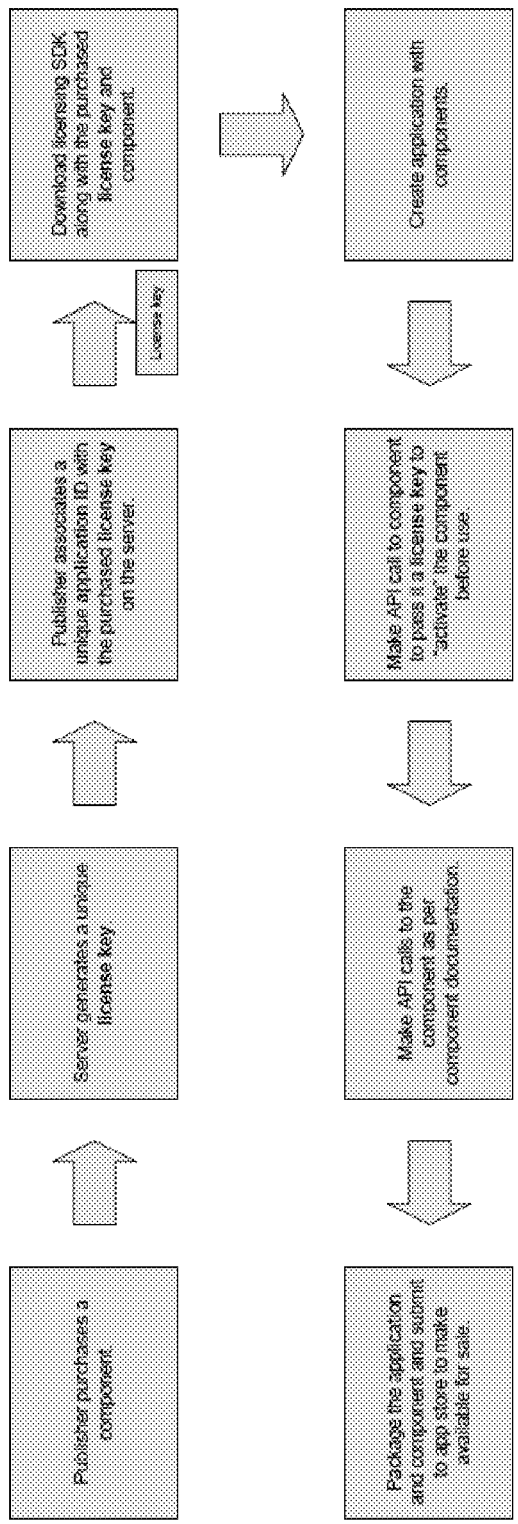
FIG. 2 is a flowchart showing a process flow for facilitating a purchase of a component for integration with an application that is licensed in accordance with an embodiment.

FIG. 2 shows an embodiment of a process whereby the updated component is purchased by a component marketplace user. The server generates a unique license key. The publisher associates a unique application ID with the purchased license key on the component marketplace server. The purchaser downloads a licensing SDK along with the purchased license key and the component. The purchaser then uses the component to construct an application that utilizes functionality of the purchased and licensed component. An API call is invoked to the component to pass it a license key to "activate" the component prior to use. API calls can be made as defined within component documentation. The user packages the application and the component and submits the application to an application store to make it available for sale.

In an embodiment, the license management features disclosed herein can function with or without the need to copy protect a library in component form. For example, a company having a SDK or a component publisher having source code can use the license manager to embed a one-line call to a back end validation service. The use of buyer keys, or similar, to embed the code into an application function similarly to what has been described herein.

Figure 3:
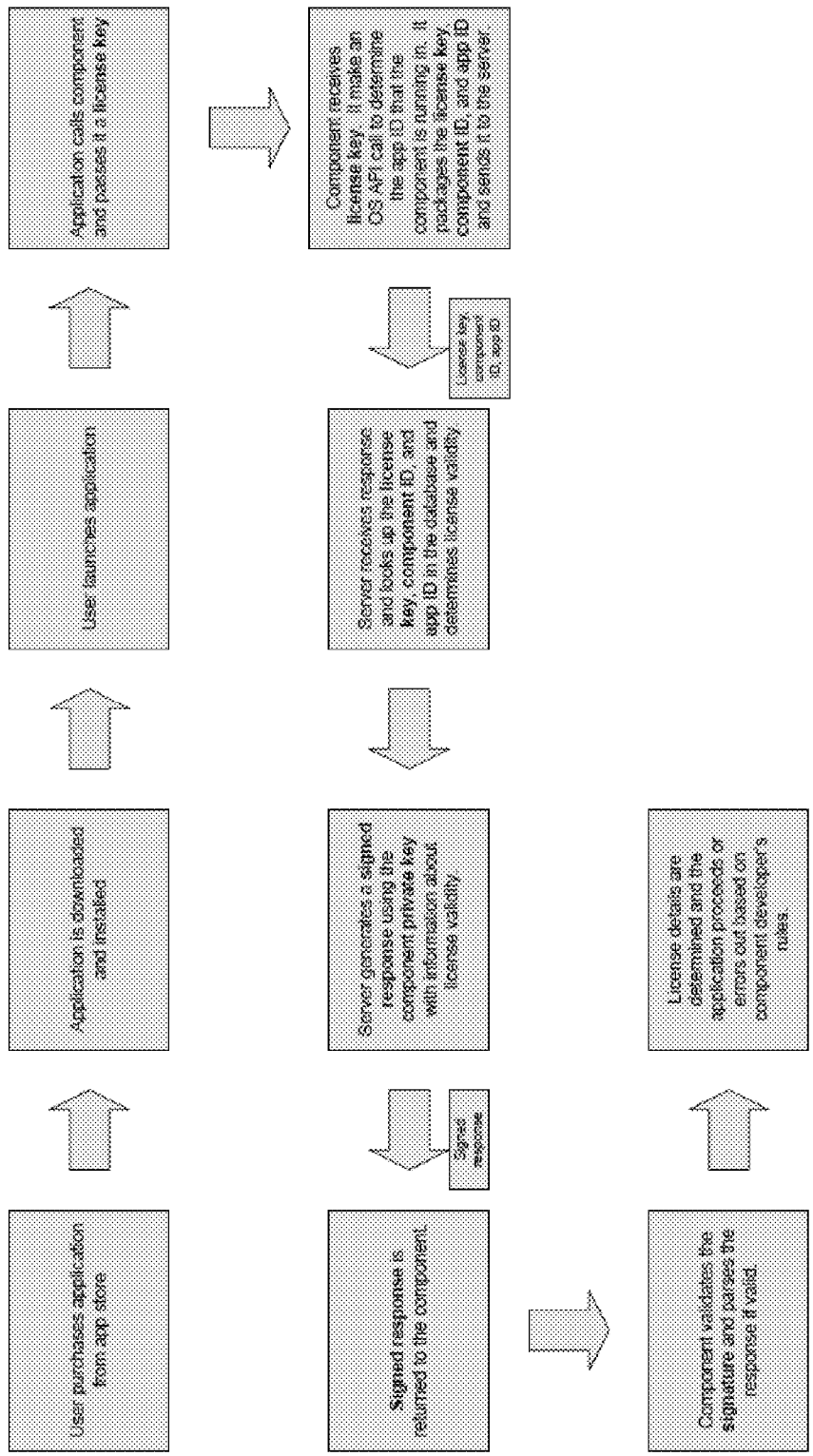
FIG. 3 is a flowchart showing a process flow for facilitating purchase of an application that includes a component that is licensed in accordance with an embodiment.

FIG. 3 shows an embodiment of a process of validating licenses for an application purchased from the application store. A purchaser purchases an application from the application store and the application is downloaded and installed in the purchaser's computing device. The purchaser launches the application and the application calls the component and passes the component a license key. In an embodiment, the component receives the license key and executes an OS API call to determine the application ID that the component is running in. In an embodiment, the license key, component ID and application ID is packaged and sent to the component marketplace server. In an embodiment, the component marketplace server receives a response and looks up the license key, component ID, and application ID in a database to determine the validity of the license. This can include checking details associated with the license such as license expiry by date, number of allowed installs, number of allowed uses (application invocations), and activation flags for submodules of a component. This can allow components to perform metering and tracking for statistics and more fine-grained licensing schemes. In an embodiment, the component marketplace server generates a signed response using the component private key with information about the license validity. In an embodiment, a signed response is returned to the component and the component validates the signature and parses the response if valid. The license details are determined and the application proceeds or errors out based on the component developer's rules.

Figure 4:
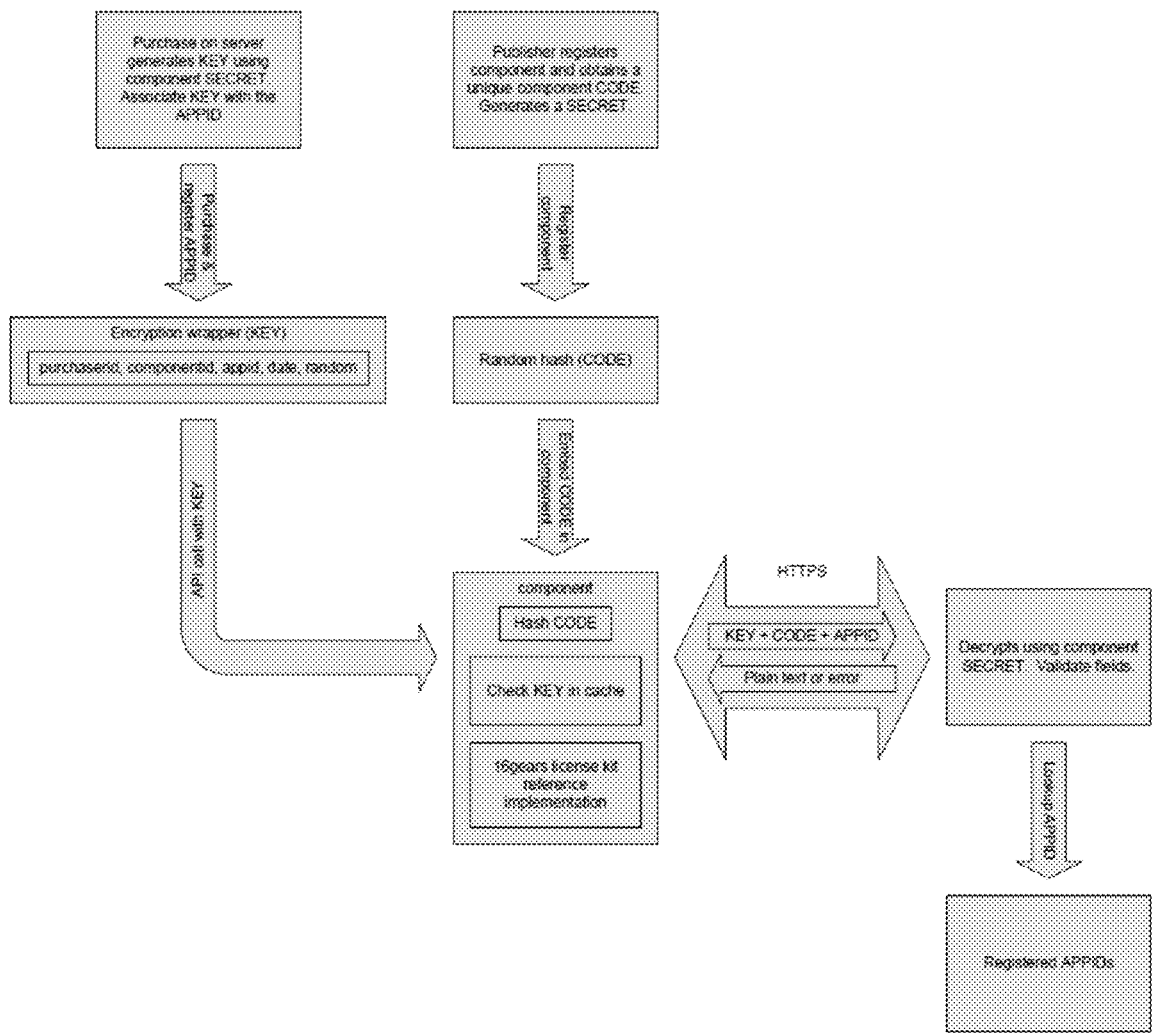
FIG. 4 is a combination diagram and flowchart showing a detailed process flow for facilitating component licensing in accordance with an embodiment.
Figure 5:
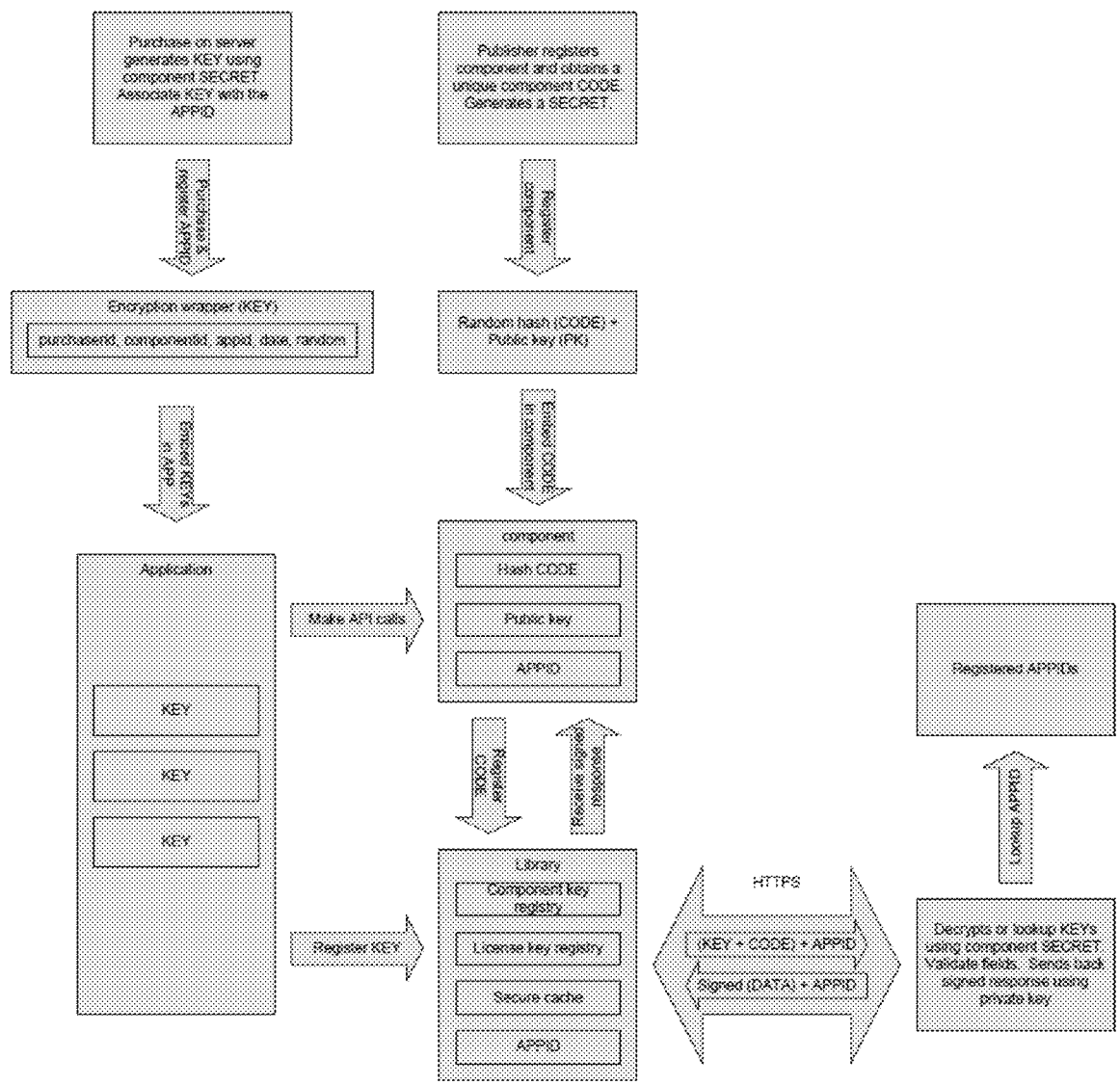
FIG. 5 is a combination diagram and flowchart showing a detailed process flow for facilitating a purchase of a component for integration with an application that is licensed in accordance with an embodiment.

FIGS. 4 and 5 provide a more detailed view of an embodiment of a process flow for registering and validating components that are listed and purchased on a component marketplace server.

With reference to FIGS. 6 through 20, the following describes procedures that can be used by application developers to embed the license manager into a component. The application developer can first be required to obtain a component developer license key from the component marketplace website. Also, for this discussion, we will be assuming that the target operating system will be iOS4.3 using XCode 4.

Figure 6:
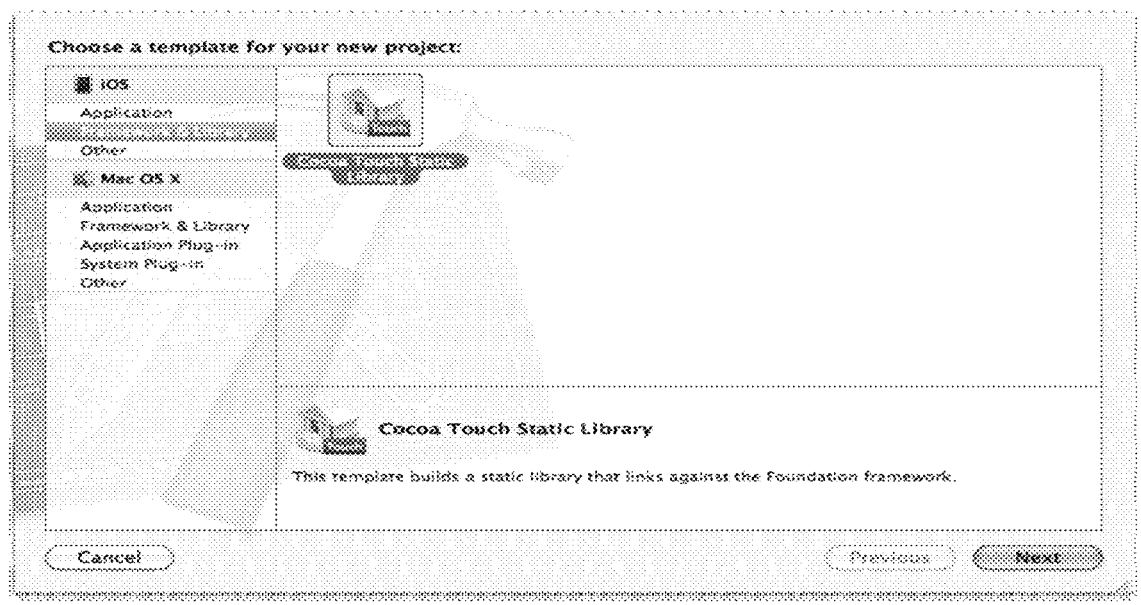
FIG. 6 is a screen capture showing the application facilitating the creation of a new static library for the application developer's component in accordance with an embodiment.
Figure 7:
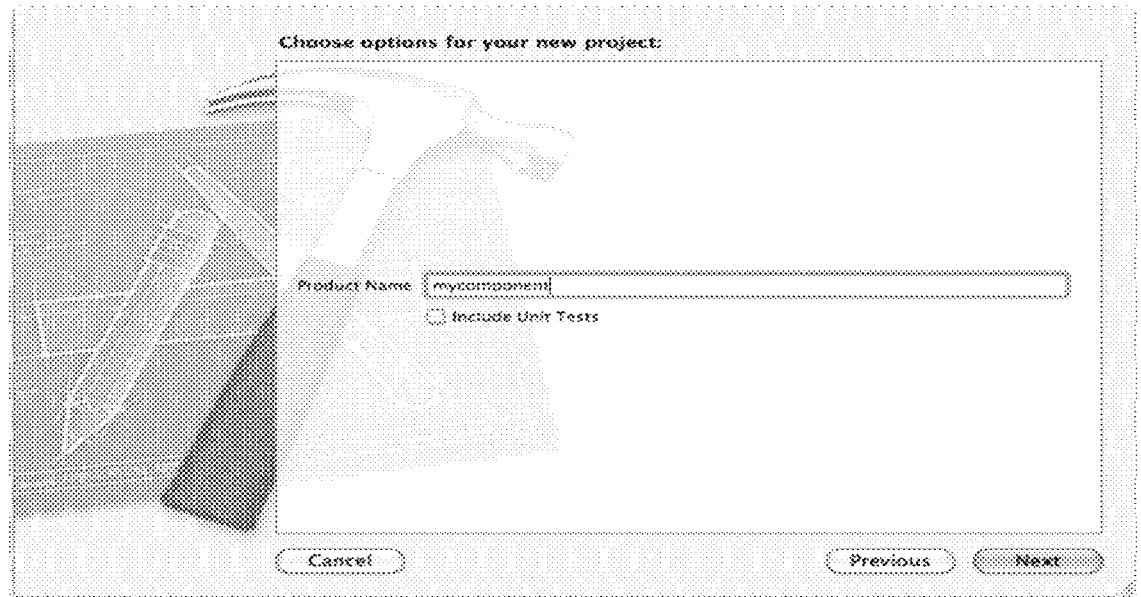
FIG. 7 is a screen capture showing an interface for entering a new component project in accordance with an embodiment.
Figure 8:
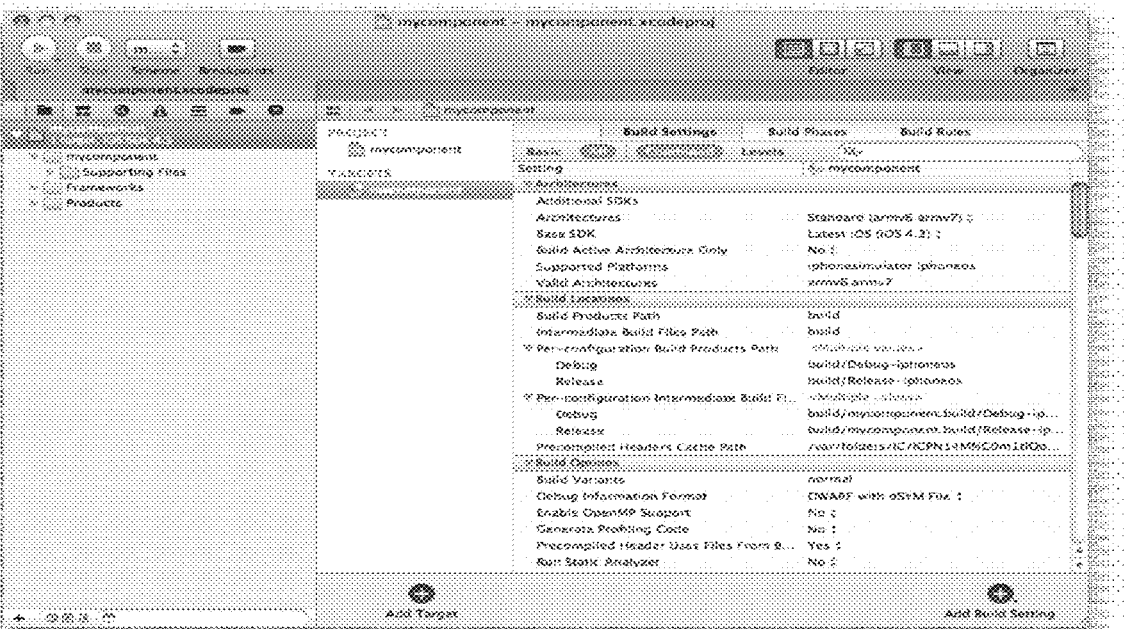
FIG. 8 is a screen capture showing an interface for displaying details for a saved component project in accordance with an embodiment.

FIG. 6 is an illustrative user interface showing the application facilitating the creation of a new static library for the application developer's component. In this example, the user (i.e., the application developer) selects the menu, File→New→New Project. On the left panel under the "iOS" section, the user can select "Framework & Library". The application displays an icon for developing a static library of a given name. The user selects the icon and presses the "Next" button to proceed. It should be understood, however, that the disclosed systems and methods are not limited to licensing components in static libraries, but rather, is applicable to licensing components in any form now known or later to be developed in the art, Referring now to FIG. 7, an illustrative user interface is shown where the user enters the name for the new library. In this example, the user has named the project "mycomponent". After entering the project name, the user can select the "Next" button and specify a path to store the new project. The results of the procedures of FIG. 7 are shown in the illustrative user interface of FIG. 8.

Figure 9:
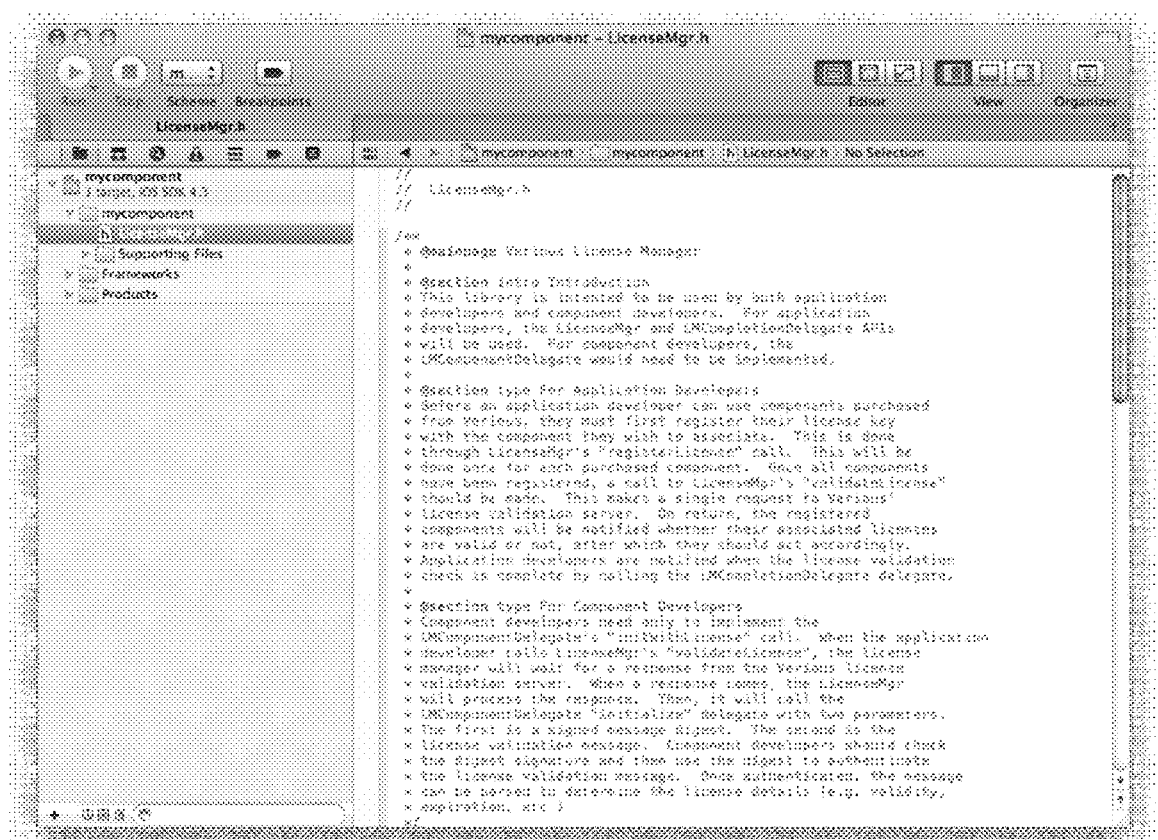
FIG. 9 is a screen capture showing an interface for adding files to a component project in accordance with an embodiment.

With reference to FIG. 9, an illustrative user interface is shown where the user can right-click (or ctrl-click) on the "mycomponent" node in the project tree and select the Add Files to "mycomponent" . . . menu option. The user can then select the header file from the SDK directory. In this example, the header file is entitled, "LicenseMgr.h."

Figure 10:
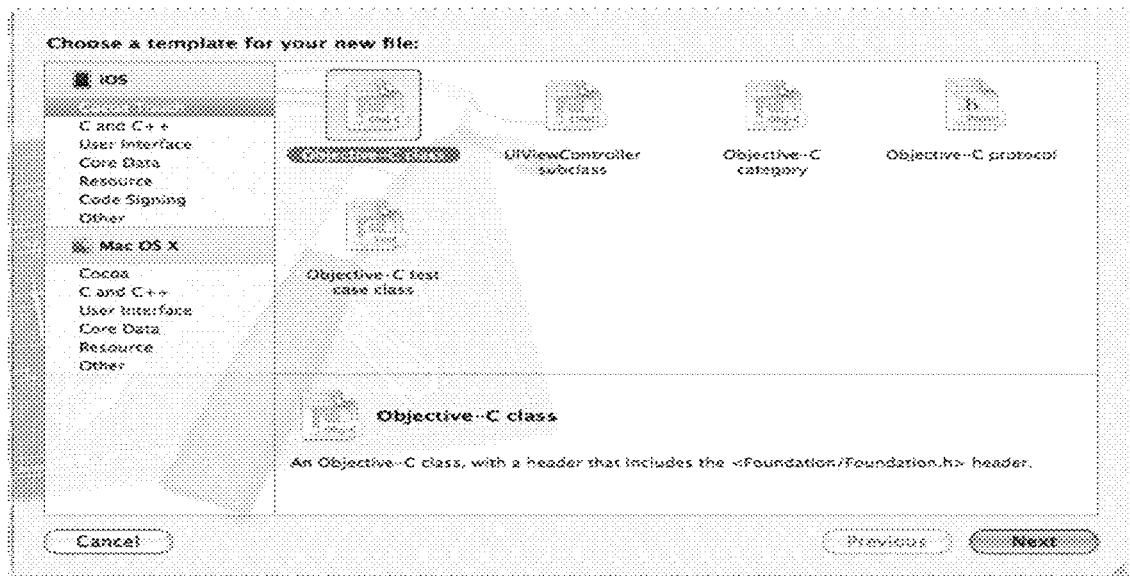
FIG. 10 is a screen capture showing an interface for creating a component API source code in accordance with an embodiment.

Referring to FIG. 10, an illustrative user interface is shown that allows the user to create the component API source code. Using this interface, the user will begin to create the component API source files. In this example, the user creates a simple Objective-C API. The user performs a right-click (or ctrl-click) on the component name (i.e., "mycomponent") in the project tree and selects "New File . . . ". A dialog box should appear. Select the "Objective-C class" icon. It should be understood, however, that the disclosed systems and methods are not limited to Objective-C, but rather, could be developed using any programming language suitable for component development now known, or later to be developed in the art.

Figure 11:
FIG. 11 is a screen capture showing an interface for selecting an object for which a subclass depends in accordance with an embodiment.

FIG. 11 shows an illustrative user interface that allows the user to select an object for which the current class is a subclass. Using a "Subclass of" drop-down, the user can select the object, which in this example is "NSObject." The user then selects the "Next" button to enter the class details, including the name of the new class, as shown in FIG. 12.

Figure 12:
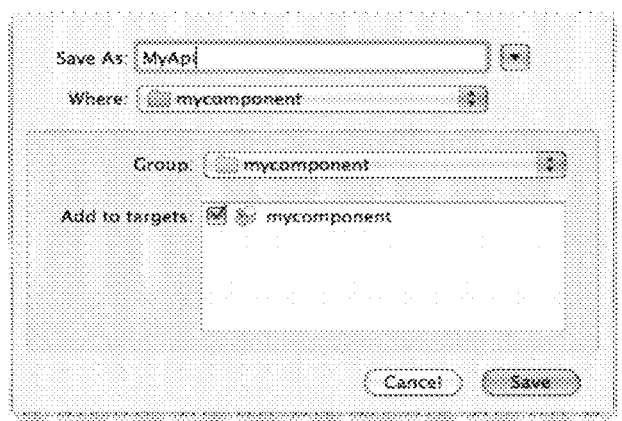
FIG. 12 is a screen capture showing an interface for entering details for a newly added class in accordance with an embodiment.
Figure 13:
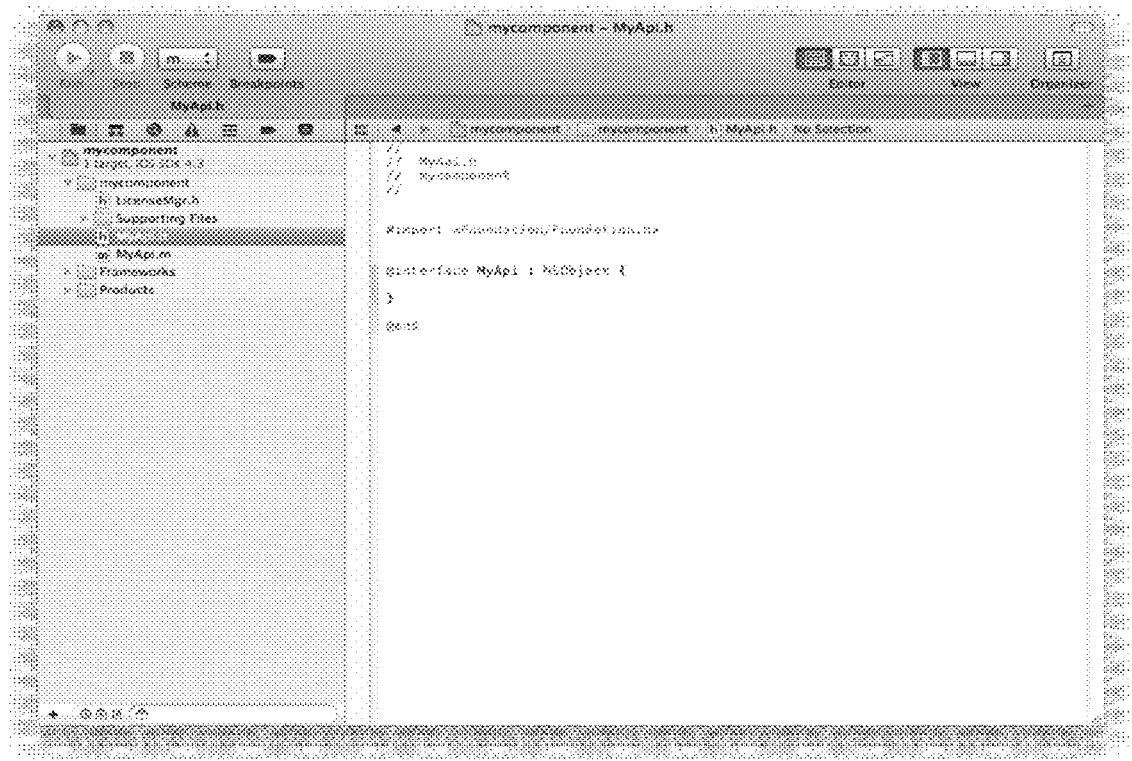
FIG. 13 is a screen capture showing an interface for displaying details of a saved project in accordance with an embodiment.

Referring now to FIG. 12, the user in this scenario is creating "MyApi.m" and "MyApi.h" files. After entering the class details, the user selects a "Save" button to create the files. After saving the project, details of the resulting project appear as shown in FIG. 13.

Add License Manager Code

In an embodiment, to develop a component, the user modifies the project files. The user will want the component to implement a delegate called, for example, "LMComponentDelegate." The delegate has one function that the user can implement called, for example, "initWithLicense." When application developers use this component, they will register their purchased license key with this component. After this registration and when users submit the keys to be validated, a response will be generated. The response is sent to this component via this delegate function.

In an embodiment, the "initWithLicense" function takes two parameters. The first parameter is a signed message digest and the second parameter is the message containing information about the license validity. The first parameter can be ignored or the component can check the signature and the hash against the digest.

The following code listing shows how the user could modify the header file, for example, "MyApi.h:

```
#import <Foundation/Foundation.h>
#import "LicenseMgr.h"
class com_verious_MyApiLicense {
private:
    static bool licenseValid;
public:
    static bool isValid( ) {
        return licenseValid;
    }
    static void validateLicense(NSData *signedHash, NSString * validity);
};
@interface MyApi : NSObject <LMComponentDelegate> {
}
- (void)initWithLicense:(NSData *)signedHash validity:(NSString *) validity;
- (NSString*)reverseString:(NSString *)input;
@end
```

Note that this class will implement LMComponentDelegate (the "initWithLicense" message). The user also created a read-only Boolean property called "licenseValid". This is so application developers can check whether the component deems the license as valid.

In an embodiment, the API that the user will expose is a trivial "reverseString" that reverses the characters of the input string and returns the reversed NSString.

With the addition of the following "reverseString" code to the implementation (MyApi.m). For invalid licenses, it an be made to return an error code or raise an exception. This example raises an invalid license exception. Also, the user can synthesize a "licenseValid" flag that the "initWithLicense" delegate will set.

```
/**
 * Reverses a given string. We'll check the license first. If valid, we
 * perform the string reverse. Otherwise, we'll return the string
 * "Invalid License".
 */
- (NSString*)reverseString:(NSString*)input {
    if (com_verious_MyApiLicense::isValid( )) {
        NSMutableString    *result   =   [[NSMutableString alloc]initWithCapacity: [input length]];
        for (int i= [input length]-1; i>=0; i--) {
            [result appendFormat:@"%c", [input characterAtIndex:i]];
        }
        return [result autorelease];
    }
    @throw [NSException exceptionWithName:@"LicenseException" reason:@"Invalid license" userInfo:nil];
//    return @"Invalid License";
}
```

The user can copy the following method to the class. This will be the "initWithLicense" delegate method that will perform a signature check to ensure that the license validity message your component gets from the server is authentic. Note that "initWithLicense" calls some crypto APIs. Therefore, the user can be required to also include a "CommonCrypto/CommonDigest.h" header file already included when user installed XCode. Finally, the user adds the license key that was obtained from the component marketplace server and assigns it to the licenseKey variable, as demonstrated below.

```
#import "MyApi.h"
#import <CommonCrypto/CommonDigest.h>
bool com_verious_MyApiLicense::licenseValid = 0;
void com_verious_MyApiLicense::validateLicense(NSData *signedHash, NSString *validity) {
    licenseValid = FALSE;
    unsigned char licenseKey[ ] = {
        48,-126,3,89,48,-126,2,-62,-96,3,2,1,2,2,1,0,48,13,6,9,42,-122,72,-
122,-9,13,1,1,4,5,0,48,-127,-
128,49,11,48,9,6,3,85,4,6,19,2,85,83,49,11,48,9,6,3,85,4,8,19,2,67,65,49,18,48
,16,6,3,85,4,7,19,9,83,117,110,110,121,118,97,108,101,49,16,48,14,6,3,85,4,10,
19,7,86,101,114,105,111,117,115,49,10,48,8,6,3,85,4,11,19,1,45,49,16,48,14,6,3
,85,4,3,19,7,86,101,114,105,111,117,115,49,32,48,30,6,9,42,-122,72,-122,-
9,13,1,9,1,22,17,107,101,118,105,110,64,118,101,114,105,111,117,115,46,99,111,
109,48,30,23,13,49,49,48,54,50,49,48,51,52,51,50,48,90,23,13,50,49,48,54,49,56
,48,51,52,51,50,48,90,48,-127,-
128,49,11,48,9,6,3,85,4,6,19,2,85,83,49,11,48,9,6,3,85,4,8,19,2,67,65,49,18,48
,16,6,3,85,4,7,19,9,83,117,110,110,121,118,97,108,101,49,16,48,14,6,3,85,4,10,
19,7,86,101,114,105,111,117,115,49,10,48,8,6,3,85,4,11,19,1,45,49,16,48,14,6,3
,85,4,3,19,7,86,101,114,105,111,117,115,49,32,48,30,6,9,42,-122,72,-122,-
9,13,1,9,1,22,17,107,101,118,105,110,64,118,101,114,105,111,117,115,46,99,111,
109,48,-127,-97,48,13,6,9,42,-122,72,-122,-9,13,1,1,1,5,0,3,-127,-115,0,48,-
127,-119,2,-127,-127,0,-48,-24,-2,-88,56,75,68,-57,-71,101,122,62,2,-105,32,-
39,-32,-43,108,97,127,-75,-85,-1,44,-20,-65,-29,-42,-72,-65,4,-14,16,-67,97,-
3,113,-28,-36,-50,-15,-91,86,0,-104,33,-99,-102,63,-105,54,-91,83,40,-25,41,-
117,34,-80,-114,30,37,55,102,123,-90,-97,-33,38,81,4,-23,50,88,94,67,111,-
107,39,-17,-82,34,-12,121,12,-19,81,-124,50,-94,-98,111,-18,-109,-33,-26,-
52,84,79,-76,55,87,-35,65,-83,-5,10,-71,11,-11,-120,53,54,-122,15,-78,39,-
95,91,46,25,-95,-113,-57,1,63,-45,2,3,1,0,1,-93,-127,-32,48,-127,-
35,48,29,6,3,85,29,14,4,22,4,20,-10,-112,-80,-7,-33,-87,114,-13,-82,0,-
78,93,19,-23,126,-15,58,-96,127,90,48,-127,-83,6,3,85,29,35,4,-127,-91,48,-
127,-94,-128,20,-10,-112,-80,-7,-33,-87,114,-13,-82,0,-78,93,19,-23,126,-
15,58,-96,127,90,-95,-127,-122,-92,-127,-125,48,-127,-
128,49,11,48,9,6,3,85,4,6,19,2,85,83,49,11,48,9,6,3,85,4,8,19,2,67,65,49,18,48
,16,6,3,85,4,7,19,9,83,117,110,110,121,118,97,108,101,49,16,48,14,6,3,85,4,10,
19,7,86,101,114,105,111,117,115,49,10,48,8,6,3,85,4,11,19,1,45,49,16,48,14,6,3
,85,4,3,19,7,86,101,114,105,111,117,115,49,32,48,30,6,9,42,-122,72,-122,-
9,13,1,9,1,22,17,107,101,118,105,110,64,118,101,114,105,111,117,115,46,99,111,
109,-126,1,0,48,12,6,3,85,29,19,4,5,48,3,1,1,-1,48,13,6,9,42,-122,72,-122,-
9,13,1,1,4,5,0,3,-127,-127,0,77,-69,127,100,53,-69,-42,-79,-40,-
62,15,99,113,103,43,87,-116,13,94,-31,31,-79,64,108,6,32,92,69,-123,94,-
92,27,-109,123,-1,-40,62,-15,-9,78,-43,105,127,123,-13,-80,-86,-75,-109,-101,-
71,-5,121,121,62,-120,-46,-93,-30,62,91,103,-77,68,108,29,-44,70,111,99,61,-
77,-126,61,-33,69,63,110,-85,59,-102,113,-76,-66,-86,-58,-110,-97,-
60,30,69,111,53,67,44,52,15,64,77,58,-123,4,-113,96,-22,-104,-27,14,-
34,32,121,77,5,126,-68,-109,-93,104,-36,71,-112,-61,-101,-30,102,-117,107,-50
    };
    NSData *encodedKeyBytes = [[NSData alloc] initWithBytes:licenseKey length:sizeof(licenseKey)];
    SecCertificateRef cert = SecCertificateCreateWithData(NULL, (CFDataRef)encodedKeyBytes);
    SecTrustRef trust;
    SecTrustCreateWithCertificates((CFTypeRef)cert, SecPolicyCreateBasicX509( ), &trust);
    SecTrustResultType result;
    SecTrustEvaluate(trust, &result);
    SecKeyRef key = SecTrustCopyPublicKey(trust);
    // Get binary version of encrypted string
    uint8_t plain[128];
    size_t actualLen = 128;
    // Decrypt the message
    if (SecKeyDecrypt(key, kSecPaddingNone,
            (const uint8_t*) [signedHash bytes], [signedHash length],
            plain, &actualLen) == 0) {
        // Remove PKCS1 padding
        int i=0;
        while (plain[i]==0) { i++; }
        while (plain[i]!=0) { i++; }
        i++;
        NSData *sentDigest = [NSData dataWithBytes:(plain+i) length:actualLen-i];
        // Generate SHA1 of the message
        CC_SHA1_CTX ctx;
        CC_SHA1_Init(&ctx);
        CC_SHA1_Update(&ctx, (void*) [validity UTF8String], [validity length]);
        uint8_t hash[CC_SHA1_DIGEST_LENGTH];
        memset((void*)hash, 0, CC_SHA1_DIGEST_LENGTH);
        CC_SHA1_Final(hash, &ctx);
        NSData *digest = [NSData dataWithBytes:hash length:CC_SHA1_DIGEST_LENGTH];
        // Make sure digest matches message
```

```
            if ([sentDigest IsEqualToData:digest]) {
                if ([validity rangeOfString:@"valid"].location==0) {
                    // Check app id
                    NSString* appid = [[[NSBundle mainBundle] infoDictionary]
objectForKey:@"CFBundleIdentifier"];
                    NSRange idx = [validity rangeOfString:@",appid="];
                    if (idx.location!=NSNotFound) {
                        idx.location += 7;
                        idx.length = [validity length] - idx.location;
                        NSRange  endIdx  =  [validity  rangeOfString:@","
options:NSLiteralSearch range:idx];
                        NSString    *sentAppId    =    [validity
substringWithRange:NSMakeRange(idx.location, endIdx.location - idx.location)];
                        if ([sentAppId isEqualToString:appid]) {
                            licenseValid = TRUE;
                        }
                    }
                    // Parse validity date
                    idx = [validity rangeOfString:@",exp="];
                    if (idx.location!=NSNotFound) {
                        idx.location += 5;
                        idx.length = [validity length] - idx.location;
                        NSRange  endIdx  =  [validity  rangeOfString:@","
options:NSLiteralSearch range:idx];
                        NSString    *validityDate    =    [validity
substringWithRange:NSMakeRange(idx.location, endIdx.location - idx.location)];
                        NSTimeInterval   date   =   [[NSDate   date]
timeIntervalSince1970];
                        // Date expired?
                        if ([validityDate intValue]<(int)date) {
                            licenseValid = FALSE;
                        }
                    }
                }
            }
        }
}
@implementation MyApi
/**
  * Cut and paste code for LMComponentDelegate.
  */
- (void)initWithLicense:(NSData *)signedHash validity: (NSString *)validity {
    com_verious_MyApiLicense::validateLicense(signedHash, validity);
}
@end
```

Now, the user can build the API for the simulator and device. The result should appear in the build products directory as "libmycomponent.a.", for example. The component will then be ready to use. The user can publish the component to the component marketplace website.

This following describe various embodiments for allowing component purchasers to purchase, download, and integrate their licensed component within their own application. Specifically, the following steps provide an example of how a purchaser (application developer) can use the license key purchased for a component marketplace component. For this example, we will assume that the purchaser purchased the component that was developed in the example presented above.

Figure 14:
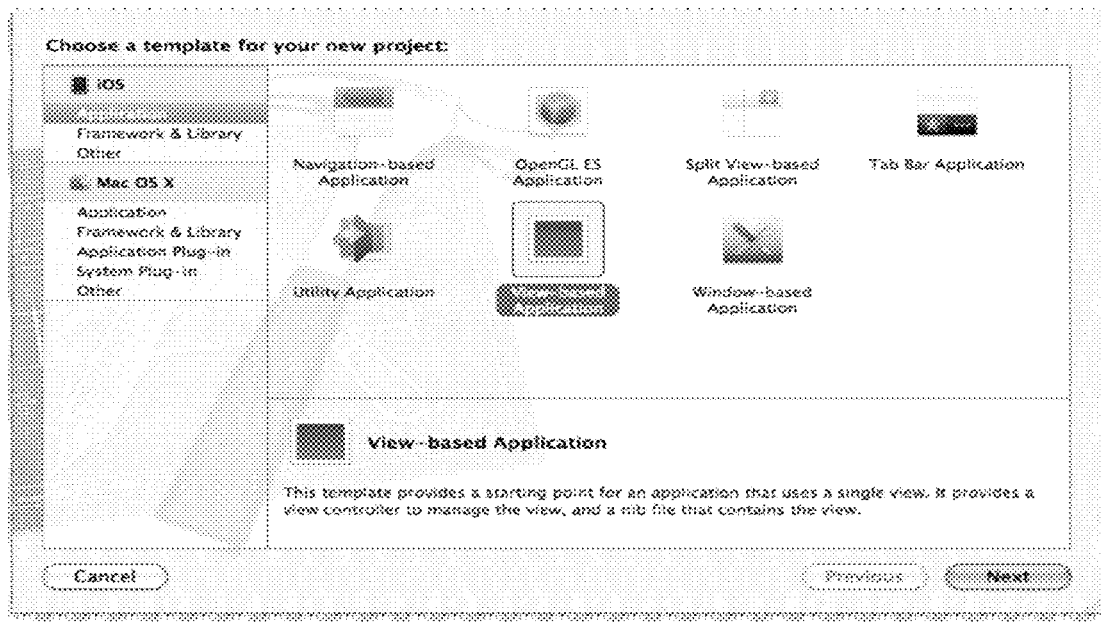
FIG. 14 is a screen capture showing an interface for creating a new application project in accordance with an embodiment.

With reference to FIG. 14, an illustrative user interface is shown whereby an application developer can create a New iOS Project for his application by selecting the menu item: File→New→New Project. On the left panel under the "iOS" section, the application developer selects "Application" and will see an icon for developing a "View-based Application." The application developer can select the icon and select the "Next" button.

Figure 15:
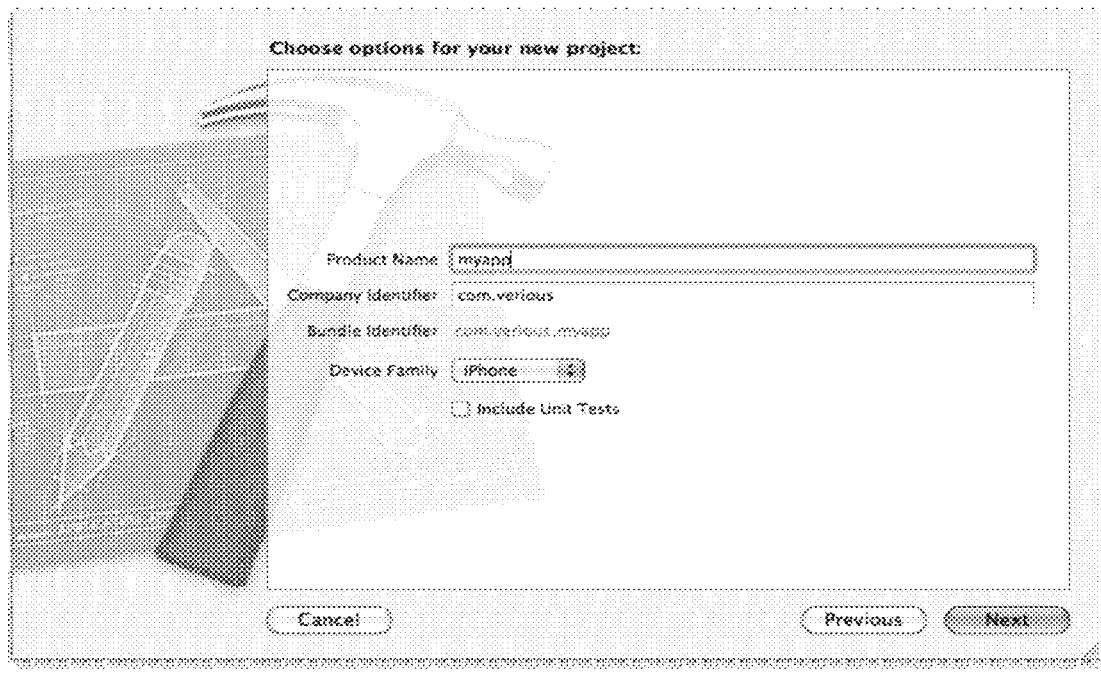
FIG. 15 is a screen capture showing an interface for entering details for a new application project in accordance with an embodiment.
Figure 16:
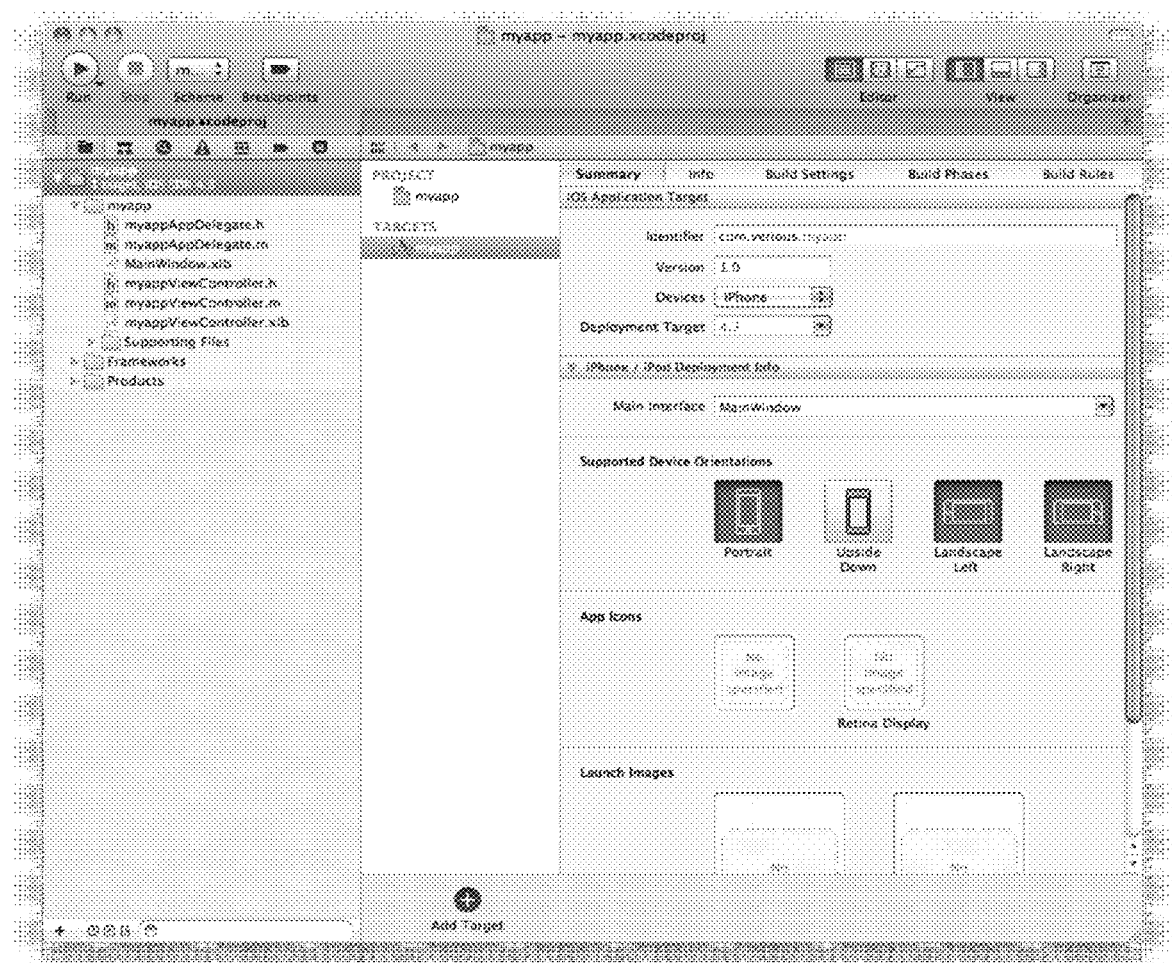
FIG. 16 is a screen capture showing an interface for displaying details or a saved application project in accordance with an embodiment.

Referring to FIG. 15, an illustrative user interface is shown whereby the application developer enters a name for the new application. In this example, the application developer has named the project "myapp." The application developer enters the company identifier, "com.verious" since the license key is locked to the iOS app bundle identifier "com.verious.myapp." The application developer selects the "Next" button and specifies a path to store the project. The result should appear as shown in FIG. 16.

Figure 17:
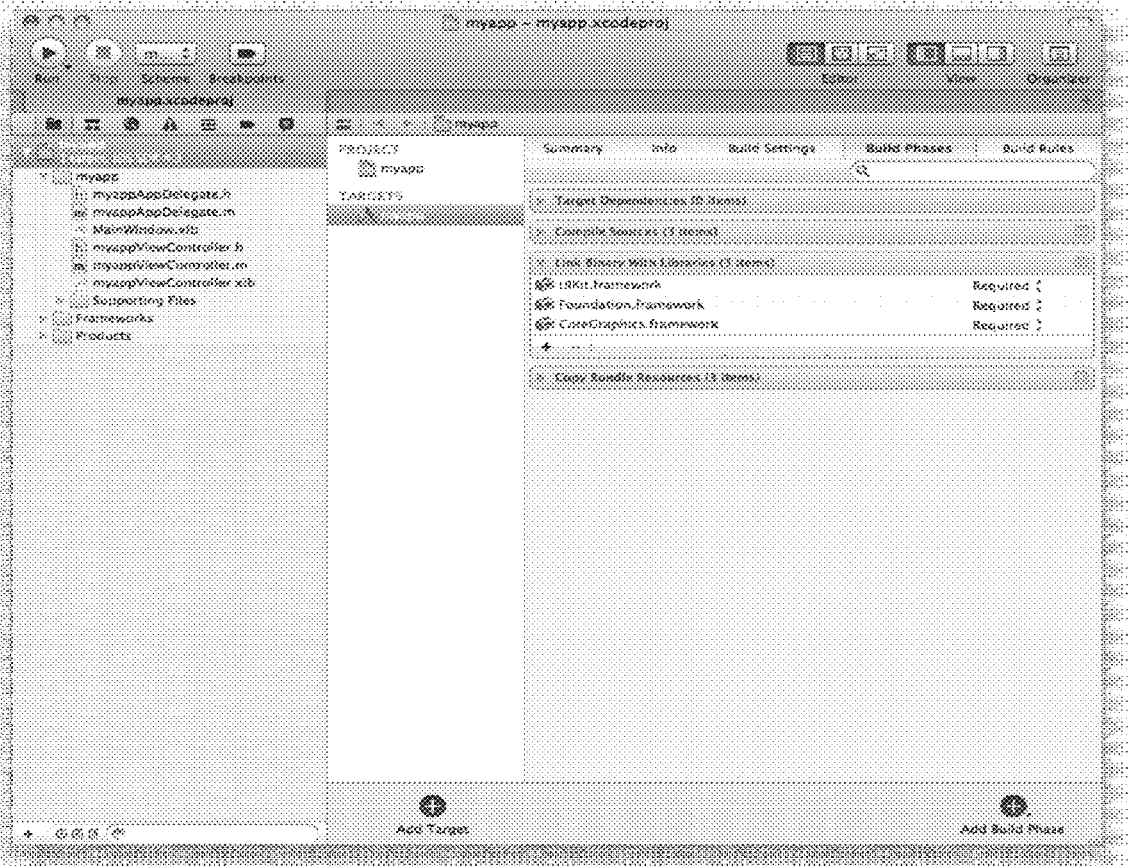
FIG. 17 is a screen capture showing an interface for adding a security framework to an application project in accordance with an embodiment.

Referring now to FIG. 17, an illustrative user interface is shown whereby the application developer can interact with the interface to add the security framework to the project. From the "myapp" project details tree node, the application developer selects the "Build Phases" tab and expands the "Link Binary With Libraries" section. The application developer can add a new framework by selecting the "+" button.

Figure 18:
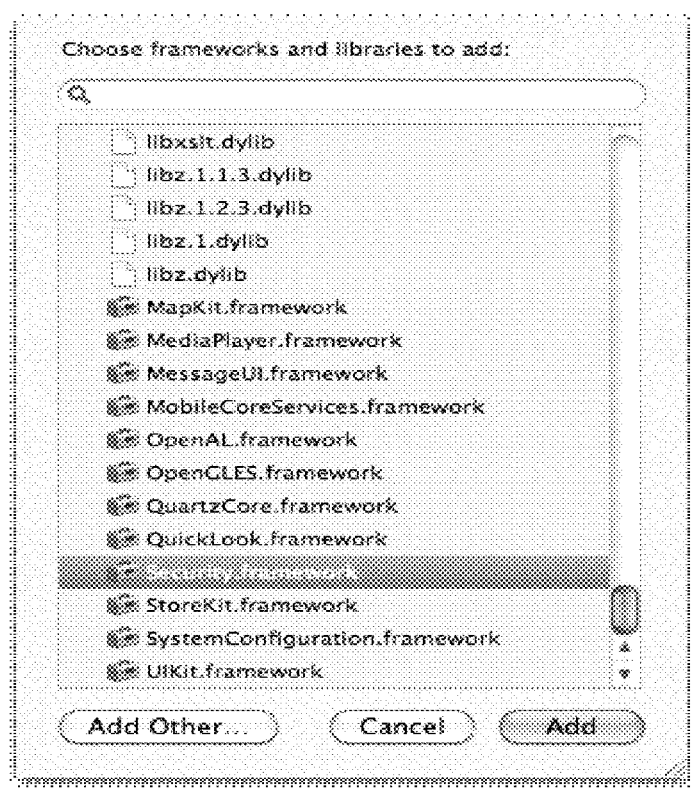
FIG. 18 is a screen capture showing an interface for selecting a pre-configured security framework in accordance with an embodiment.

Referring to FIG. 18, an illustrative user interface is shown whereby the application developer selects the "Security-.framework" to add to the project and selects the "Add" button.

Figure 19:
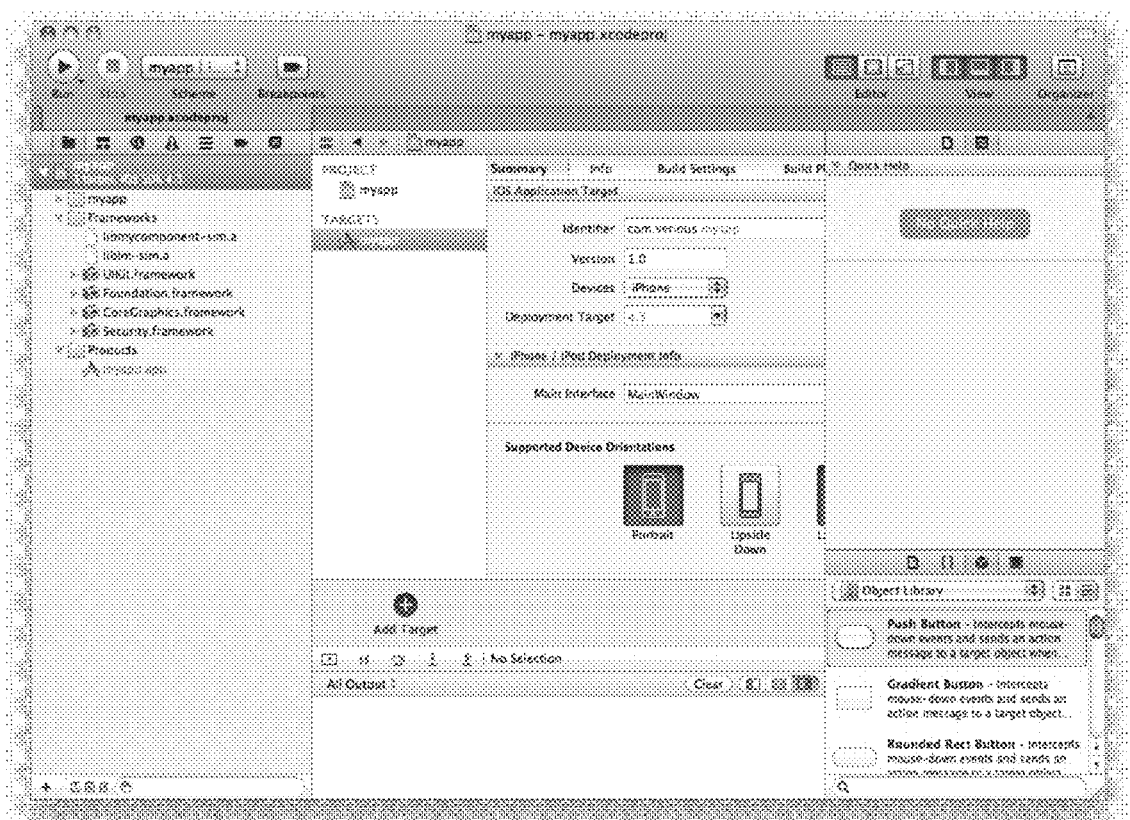
FIG. 19 is a screen capture showing an interface for adding license manager and component files to a application project in accordance with an embodiment.

Referring to FIG. 19, an illustrative user interface is shown whereby the application developer can add the license manager and component files by right-clicking (control-click), for example, the "Frameworks" node in the tree and selecting Add Files to "myapp" . . . menu option. The license manager files can include, for example, "liblm-dev.a", "liblm-sim.a", and "LicenseMgr.h." In an embodiment, component has header files and a set of libraries for the device and simulator builds. In this example, the application developer is using the "mycomponent" component. These files include "libmycomponent-dev.a", "libmycomponent-sim.a", and "MyApi.h."

With reference to FIG. 19, an illustrative user interface is shown whereby the application developer can interact with the interface to add an outlet to the project. First, the application developer edits the file that XCode created called "myappViewController.h" and adds a new property called "status." In an embodiment, the application developer can implement the LMCompletionDelegate from the license manager. In an embodiment, this delegate is invoked when the license response is received from the component marketplace license validation server and allows the application developer know that it can start calling component functions.

```
#import <UIKit/UIKit.h>
#import "MyApi.h"
@interface myappViewController : UIViewController
<UITextFieldDelegate,
LMCompletionDelegate> {
    IBOutlet UILabel *reverseText;
    IBOutlet UITextField *normalText;
    MyApi *api;
}
- (void) licenseCheckCompleted;
- (BOOL) textFieldShouldReturn:(UITextField *) textField;
- (IBAction) reverseText:(UIButton*) sender;
@end
```

Figure 20:
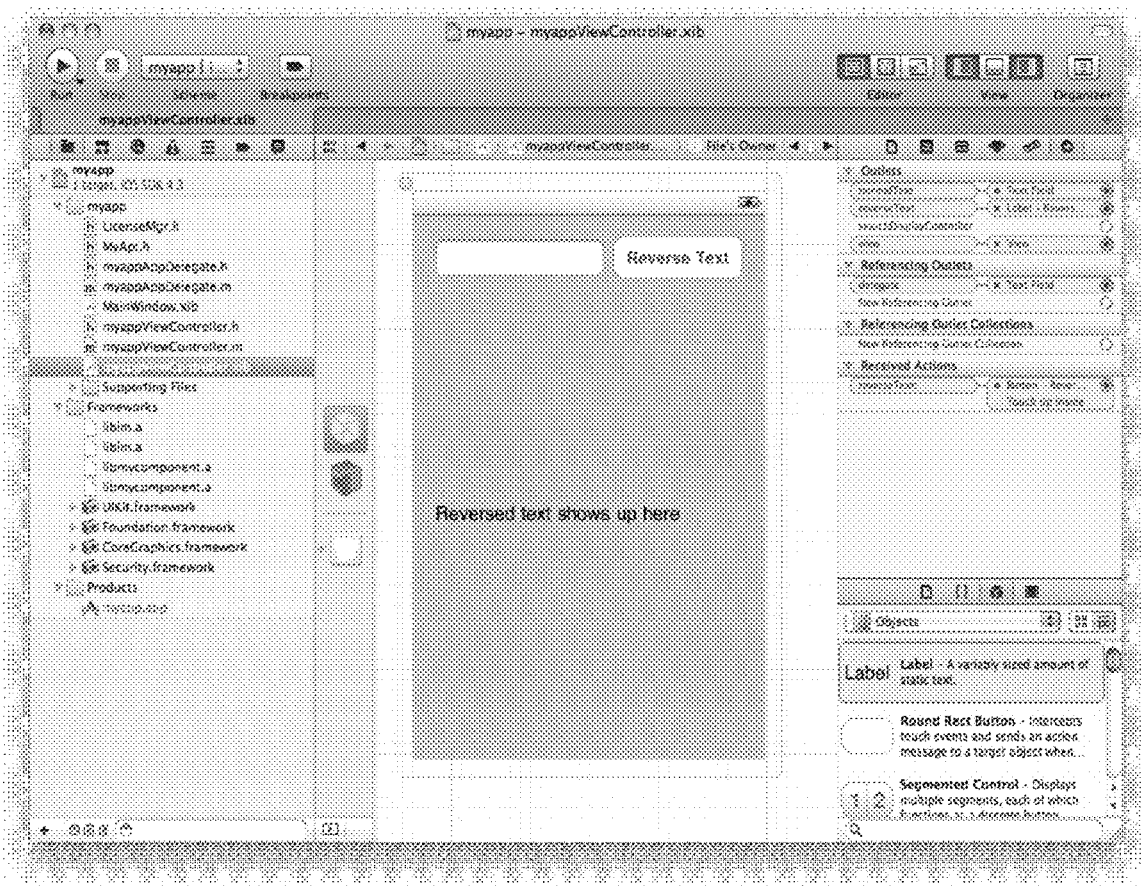
FIG. 20 is a screen capture showing an interface for defining text properties for an application project in accordance with an embodiment.

Referring to FIG. 20, an illustrative user interface is shown whereby the application developer can add an edit field for entering text, a button for reversing the text, and a large label to show the results of the reversed text. The application developer can also connect the edit field and labels to the normalText and reverseText outlets and Connect the button click to the reverseText action.

To implement the code, the application developer next edits "myappViewController.m" and implement the reverseText method to dismiss the keyboard and call the new component API to reverse the text in the edit field. The application developer will also implement textFieldShouldReturn to dismiss the keyboard and reverse the text. Currently, nothing special needs to be done when the license check is complete. Therefore, the application developer simply prints a message for licenseCheckComplete. The viewDidLoad method implements the license call and creates the component API that it wants to use. Then it registers the component along with the purchased license key using the registerLicense call. After all components to be used are registered, the validateLicenses call is made to validate against the component marketplace server.

```
#import "myappViewController.h"
#import "LicenseMgr.h"
@implementation myappViewController
- (IBAction)reverseText:(UIButton*)sender {
    [normalText resignFirstResponder];
    NSString *text = [api reverseString:normalText.text];
    reverseText.text = text;
}
- (BOOL)textFieldShouldReturn:(UITextField *)textField {
    [self reverseText:nil];
    return YES;
}
- (void)dealloc
{
    [api release];
    [[LicenseMgr instance] release];
    [super dealloc];
}
- (void) didReceiveMemoryWarning
{
    // Releases the view if it doesn't have a superview.
    [super didReceiveMemoryWarning];
    // Release any cached data, images, etc that aren't in use.
}
#pragma mark - View lifecycle
- (void)licenseCheckCompleted {
    NSLog(@"Done checking licenses") ;
}
// Implement viewDidLoad to do additional setup after loading the view,
typically from a nib.
- (void)viewDidLoad
{
    [super viewDidLoad];
    normalText.returnKeyType = UIReturnKeyNext;
    api = [[MyApi alloc] init];
    [[LicenseMgr instance] registerLicense:@
    "d92637d1683aa9a1fc560f58dd80d9d1" component:api];
    [[LicenseMgr instance] validateLicenses:self];
}
- (void)viewDidUnload
{
    [super viewDidUnload];
    // Release any retained subviews of the main view.
    // e.g. self.myOutlet = nil;
}
-
(BOOL)shouldAutorotateToInterfaceOrientation:
(UIInterfaceOrientation)interface Orientation
{
    // Return YES for supported orientations
    return (interfaceOrientation == UIInterfaceOrientationPortrait);
}
@end
```

While the above examples have discussed embodiments relating to mobile apps such as apps implemented on iOS and Android platforms, it should be understood that the presently disclosed systems and methods could be applied to any type of software applications that utilize components obtained from third party sources. Thus, server based applications implemented on, for example, Linux or Microsoft Windows platforms, could utilize components obtained and licensed via a component marketplace as disclosed herein.

In this description, various functions and operations can be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments can be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read-only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media can store the instructions.

The instructions can also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry can be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent can be reordered and other operations can be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A method comprising:
    sending a first request, from a first user's computing device and to a first computing device, to list an application component in an online marketplace;
    generating, by the first computing device, an application component ID, a first application component key, and a second application component key in response to the first request from the first user's computing device, wherein the first and second application component keys are related to the application component;
    transmitting, by the first computing device and to the first user's device, the application component ID and the first application component key;
    generating, by the first user's computing device, a second application component by embedding the application component ID and the first application component key into the application component;
    receiving, by the first computing device, the second application component, from the first user's computing device;
    listing, by the first computing device, the second application component, in the online marketplace;
    associating, by the first computing device, a licensing key with the second application component;
    transmitting, by the first computing device and to a second user's computing device, the second application component and the associated a licensing key;
    receiving, by the first computing device and from the second application component on the second user's computing device, the application component ID and the associated licensing key in response to the execution of the application component on the second user's computing device;
    validating, by the first computing device, the received licensing key;
    in response to validating the received licensing key, generating, by the first computing device, a signed response with the second application component key;
    transmitting, by the first computing device and to the second application component executing on the second user's computing device, the signed response
    further executing the second application component on the second user's device based on validating the signed response using the first application component key extracted from the second application component.

2. The method of claim 1, wherein the second application component and the licensing key code are provided to the second user's computing device in response to a second request from the second user's computing device.

3. The method of claim 2, wherein the second request from the second user's computing device is a request to license the second application component under at least one license term.

4. The method of claim 2, wherein the second request is received from the second user's computing device via the online marketplace.

5. The method of claim 4, wherein the second request from the second user's computing device comprises an application ID of an application in which the second application component is embedded, such that the application ID and the licensing key are associated with the application component ID, such that the application ID, the application component ID and the licensing key are received from an instance of the application executing the instance of the second application component, such that the application ID, the application component ID and the licensing key are validated, such that in response to validating the application ID, the application component ID and the licensing key, the second application component key is provided to the instance of the second application component executing on the second computing device, such that the instance of the second application component is enabled to continue to execute.

6. The method of claim 5 wherein where the application ID, the application component ID and the licensing key are not validated, an indication of validation failure is provided to the instance of the second application component executing on the second computing device, such that the instance of the second application component is not enabled to continue to execute.

7. The method of claim 2, wherein the second application component relates to a third-party data provider and the at least one license terms comprise usage terms.

8. The method of claim 7, wherein the usage terms comprise one or more of: a number of users, a per user fee, an annual fee.

9. The method of claim 1, wherein the first application component key is a public key and the second application component key is a private key in a public-private key methodology.

10. The method of claim 1, wherein the application ID, the application component ID and the licensing key are received, in encrypted form, from the instance of the second application component executing on the second computing device.

11. A non-transitory computer-readable storage medium storing computer instructions when executed by at least one or more processors causes the at least one or more processors to perform the steps of:

sending a first request, from a first user's computing device and to a first computing device, to list an application component in an online marketplace;

generating, by the first computing device, an application component ID, a first application component key, and a second application component key in response to the first request from the first user's computing device, wherein the first and second application component keys are related to the application component;

transmitting, by the first computing device and to the first user's device, the application component ID and the first application component key;

generating, by the first user's computing device, a second application component by embedding the application component ID and the first application component key into the application component receiving, by the first computing device, the second application component, from the first user's computing device;

listing, by the first computing device, the second application component, in the online marketplace;

associating, by the first computing device, a licensing key with the second application component;

transmitting, by the first computing device and to a second user's computing device, the second application component and the associated licensing key receiving, by the first computing device and from the second application component on the second user's computing device, the application component ID and the associated licensing key in response to the execution of the application component on the second user's computing device;

validating, by the first computing device, the received licensing key;

in response to validating the received licensing key, generating, by the first computing device, a signed response with the second application component key;

transmitting, by the first computing device and to the second application component executing on the second user's computing device, the signed response further executing the second application component on the second user's device based on validating the signed response using the first application component key extracted from the second application component.

12. A computer system comprising:
at least one or more processors;
a memory storing computer instructions when executed by the at least one or more processors causes the at least one or more processors to perform the steps of:

sending a first request, from a first user's computing device and to a first computing device, to list an application component in an online marketplace;

generating, by the first computing device, an application component ID, a first application component key, and a second application component key in response to the first request from the first user's computing device, wherein the first and second application component keys are related to the application component;

transmitting, by the first computing device and to the first user's device, the application component ID and the first application component key;

generating, by the first user's computing device, a second application component by embedding the application component ID and the first application component key into the application component receiving, by the first computing device, the second application component, from the first user's computing device;

listing, by the first computing device, the second application component, in the online marketplace;

associating, by the first computing device, a licensing key with the second application component;

transmitting, by the first computing device and to a second user's computing device, the second application component and the associated licensing key receiving, by the first computing device and from the second application component on the second user's computing device, the application component ID and the associated licensing key in response to the execution of the application component on the second user's computing device;

validating, by the first computing device, the received licensing key;

in response to validating the received licensing key, generating, by the first computing device, a signed response with the second application component key;

transmitting, by the first computing device and to the second application component executing on the second user's computing device, the signed response further executing the second application component on the second user's device based on validating the signed response using the first application component key extracted from the second application component.

* * * * *